(12) United States Patent  (10) Patent No.: US 7,578,977 B2
Swenson  (45) Date of Patent: Aug. 25, 2009

(54) CONTAINER ASSEMBLY AND METHOD FOR MAKING ASSEMBLY

(75) Inventor: Kirk D. Swenson, North Caldwell, NJ (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 1131 days.

(21) Appl. No.: 10/785,344

(22) Filed: Feb. 24, 2004

(65) Prior Publication Data

US 2004/0222223 A1   Nov. 11, 2004

Related U.S. Application Data

(60) Provisional application No. 60/449,758, filed on May 5, 2003.

(51) Int. Cl.
*B01L 3/00* (2006.01)
(52) U.S. Cl. .................. 422/102; 220/23.83; 220/23.86; 220/23.87
(58) Field of Classification Search .................. 422/61, 422/68.1, 102; 220/23.83, 23.86, 23.87, 220/23.89
See application file for complete search history.

(56) References Cited

U.S. PATENT DOCUMENTS

| 3,807,955 | A | 4/1974 | Note, Jr. et al. |
| 4,578,588 | A | 3/1986 | Galkin |
| 4,738,827 | A | 4/1988 | Pierotti |
| 4,746,017 | A | 5/1988 | Howard et al. |
| 4,771,911 | A | 9/1988 | Morony et al. |
| 4,830,217 | A | 5/1989 | Dufresne et al. |
| 4,919,985 | A | 4/1990 | Asai et al. |
| 4,942,966 | A | 7/1990 | Kemp |
| 5,000,804 | A | 3/1991 | Nugent |
| 5,019,243 | A | 5/1991 | McEwen et al. |
| 5,055,258 | A | 10/1991 | Brodt et al. |
| 5,096,062 | A | 3/1992 | Burkardt et al. |
| 5,158,750 | A | 10/1992 | Finicle |
| 5,160,704 | A | 11/1992 | Schluter |
| 5,167,929 | A | 12/1992 | Korf et al. |
| 5,215,102 | A | 6/1993 | Guirguis |
| 5,871,700 | A | 2/1999 | Konrad |
| 6,308,846 | B1 | 10/2001 | Muller |
| 6,354,452 | B1 | 3/2002 | DeSalvo et al. |
| 6,651,835 | B2 | 11/2003 | Iskra |
| 6,749,078 | B2 * | 6/2004 | Iskra ........................ 220/23.87 |
| 2002/0011492 | A1 * | 1/2002 | Iskra ........................ 220/23.87 |
| 2002/0104840 | A1 | 8/2002 | Iskra |
| 2004/0079753 | A1 * | 4/2004 | Reichenbach et al. .... 220/23.87 |

FOREIGN PATENT DOCUMENTS

GB   0735921   7/1998
JP   8-289881   11/1996

* cited by examiner

*Primary Examiner*—Jill Warden
*Assistant Examiner*—Dwayne K Handy
(74) *Attorney, Agent, or Firm*—Mark Lindsey; The Webb Law Firm

(57) ABSTRACT

The present invention is directed to a container assembly and a method of manufacturing thereof. The container assembly includes an outer tube within an inner tube and a venting pathway extending between the inner surface of the outer tube and the outer surface of the inner tube. The venting pathway includes a combination of a textured surface area and a longitudinal groove for allowing air to vent to atmospheric pressure during insertion of the inner tube within the outer tube.

40 Claims, 11 Drawing Sheets

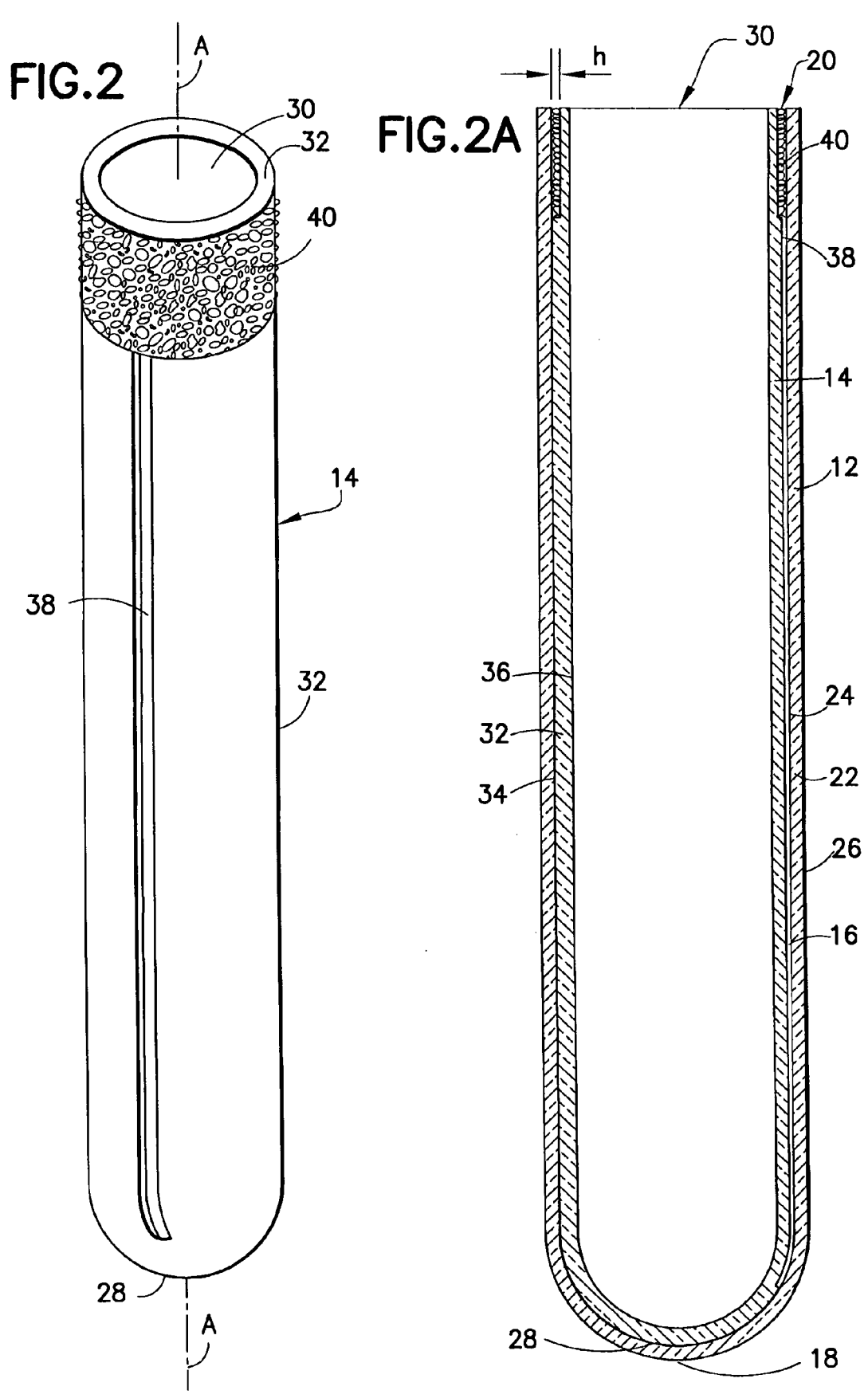

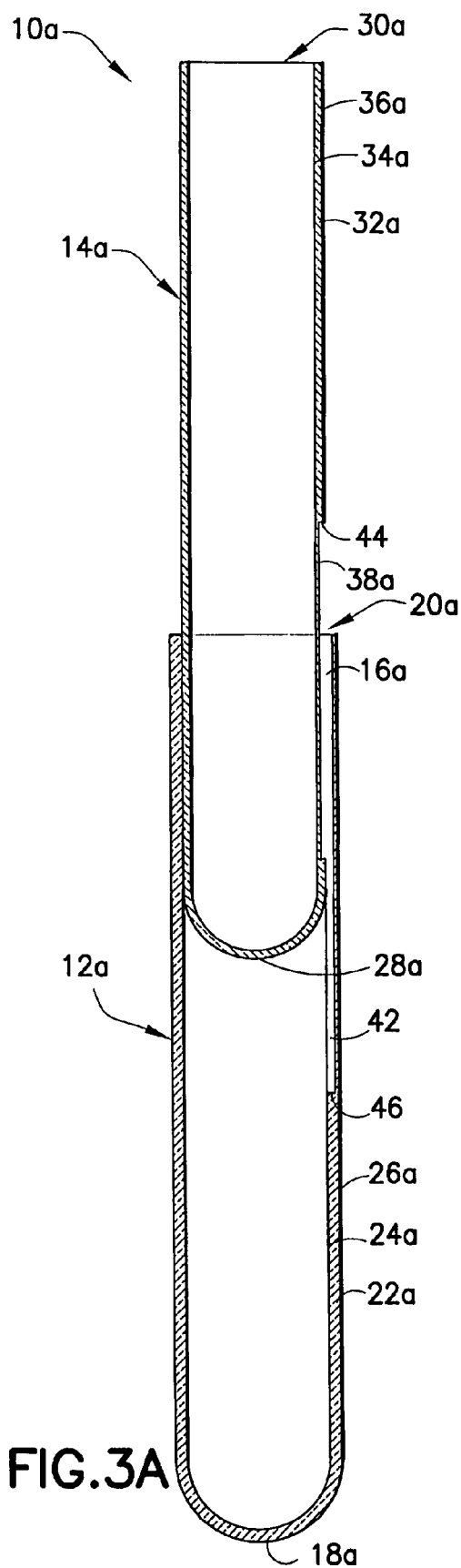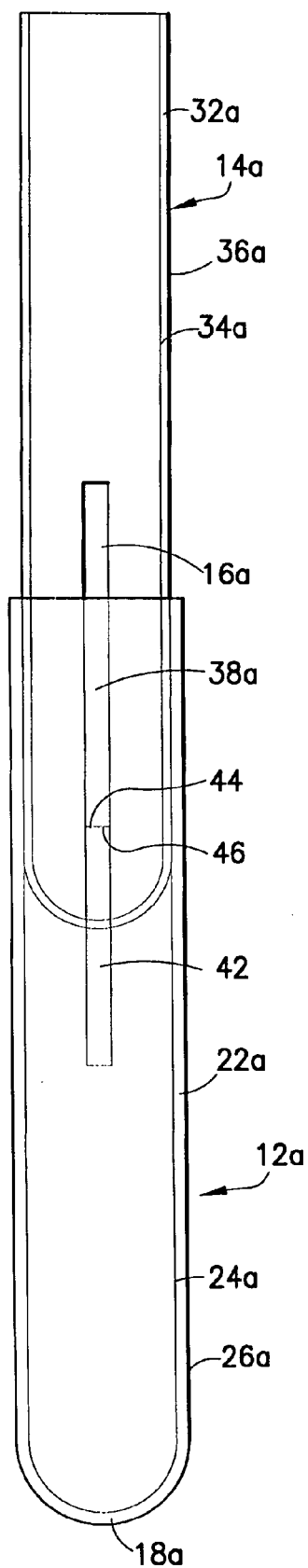
FIG.3A
FIG.3B

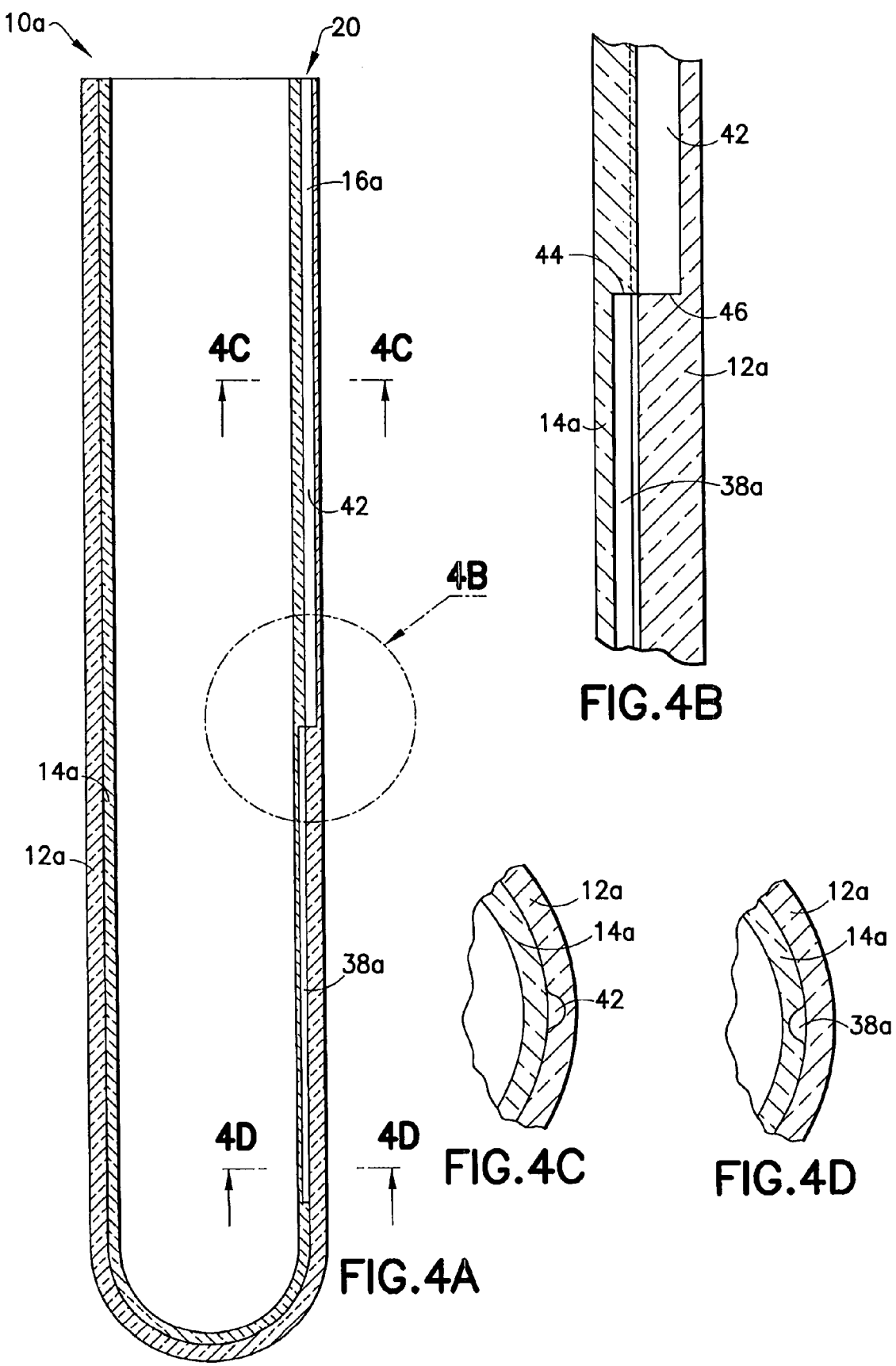

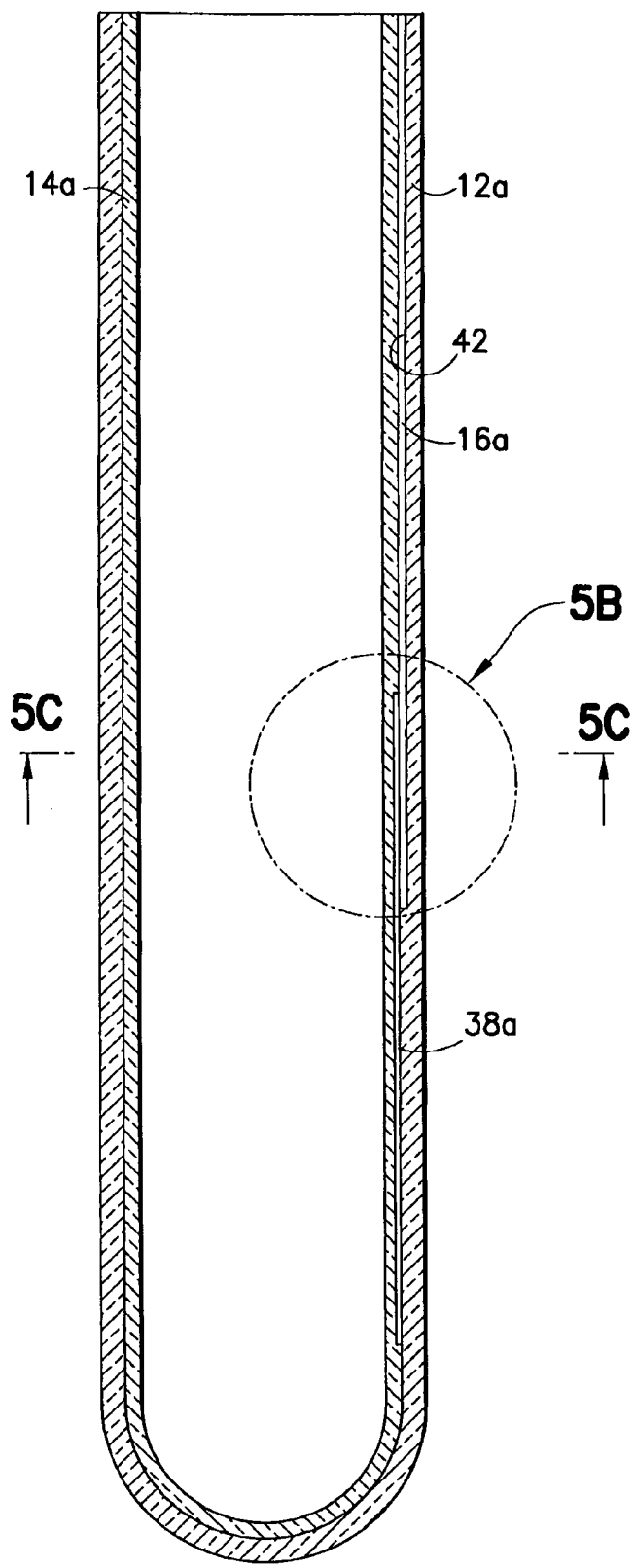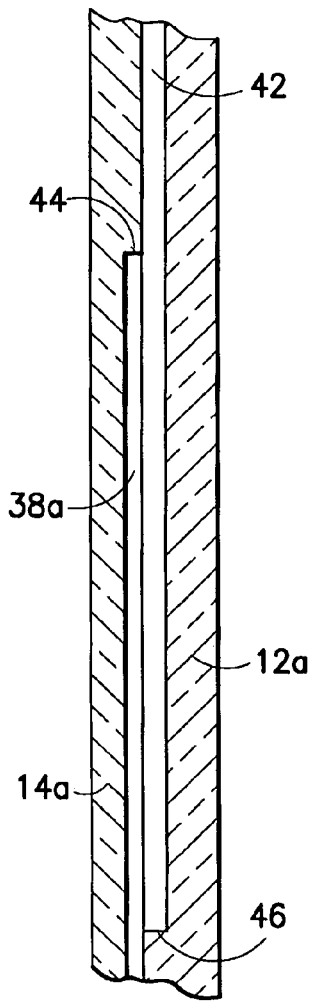
FIG.5A
FIG.5B

CONTAINER ASSEMBLY AND METHOD FOR MAKING ASSEMBLY

CROSS REFERENCE TO RELATED APPLICATIONS

This application claims the benefit of U.S. Provisional Patent Application No. 60/449,758, filed May 5, 2003, which is hereby incorporated by reference in its entirety.

BACKGROUND OF THE INVENTION

1. Field of the Invention

The present invention relates to a container assembly and method of manufacture thereof. More particularly, the present invention is directed to a container assembly and a method of assembling a container having an inner tube contained within an outer tube.

2. Description of Related Art

Glass collection containers have historically been used for collection of body fluids such as blood and urine. For example, glass inherently provides excellent vacuum retention for evacuated tubes, as well as excellent moisture retention for collection tubes containing liquid additives.

However, the medical industry has been transitioning from glass to plastic for a variety of reasons including the increased safety of a plastic tube, which tolerates impact stresses without breaking. Unfortunately, no single plastic material that is commercially acceptable from a cost and performance perspective exhibits the beneficial properties of glass. For example, plastic tubes tend to exhibit either good vacuum retention or good moisture retention, but no single plastic material exhibits both properties to a degree useful for evacuated collection tubes.

Various solutions to this problem have been devised. These include, for example, the tube-in-tube configurations described in U.S. Pat. Nos. 6,354,452 and 5,871,700, and U.S. patent application Ser. Nos. 09/933,653 and 10/114,542, the disclosures of which are hereby incorporated by reference. Such tube-in-tube configurations typically involve an inner tube positioned within an outer tube to form a container, with each of the tubes providing distinct properties to the container. More particularly, one of the tubes may provide a water vapor barrier to the container, while the other tube may provide a gas barrier to the container, thereby effectively forming a container which has both gas barrier and water vapor barrier properties.

For example, U.S. Pat. No. 6,354,452 describes a container assembly that includes an inner tube formed from a plastic that is substantially inert to bodily fluids and an outer tube that is formed from a different plastic. Collectively, the container assembly is useful for providing an effective barrier against gas and water permeability in the assembly and for extending the shelf-life of the container assembly, especially when used for blood collection. However, such a close nesting arrangement of the containers may create difficulties in the assembly process. For example, insertion of one container into another container can create some inherent manufacturing difficulties, such as the force created and exerted by trapped air upon insertion of the inner container into the outer container. Other difficulties may include the techniques by which the tubes can be held together securely and avoidance of leakage from the inner tube into the space between the two tubes.

Accordingly, a need exists for a method of assembling a container including an inner tube contained within an outer tube that eliminates the presence of a pressure gradient exerted by trapped air during the insertion of an inner container into an outer container.

SUMMARY OF THE INVENTION

The present invention provides a container assembly including an outer tube, an inner tube and a venting pathway. The outer tube includes a closed bottom, an open top and a side wall extending therebetween, defining an inner surface and an outer surface. The inner tube also includes a closed bottom, an open top and a side wall having an inner and outer surface extending therebetween. The venting pathway extends between the inner surface of the outer tube and the outer surface of the inner tube and includes a combination of a textured surface area and a longitudinal groove for allowing air to vent to atmospheric pressure during insertion of the inner tube within the outer tube. The venting pathway desirably is integrally formed with at least one of the inner tube and the outer tube.

Particularly, the longitudinal groove and the textured surface area may be located on the outer surface of the inner tube. The longitudinal groove extends from adjacent the bottom of the inner tube towards the open top of the inner tube to a location adjacent the textured surface area. The textured surface area is located on the outer surface of the inner tube and adjacent the open top of the inner tube. The textured surface may further include protrusions having a height or radial dimension equal to at least a diameter of the inner surface of the outer tube for fitting of the inner tube within the outer tube. Other arrangements of the venting pathway include the longitudinal groove and the textured surface area located on the inner surface of the outer tube. Alternatively, the textured surface may be located on the outer surface of the inner tube and the longitudinal groove located on the inner surface of the outer tube, or the textured surface area may be located on the inner surface of the outer tube and the longitudinal groove located on the outer surface of the inner tube. The venting pathway may also include an additional second longitudinal groove. Particularly, the second longitudinal groove is in fluid communication with the longitudinal groove through the textured surface area.

In a further embodiment, the present invention is directed to a method of assembling a container including an inner tube contained within an outer tube, including inserting the inner tube within the outer tube and venting air between the outer tube and the inner tube. Air is vented to atmospheric pressure during insertion of the inner tube within the outer tube through a venting pathway. The venting pathway includes a combination of the textured surface area and the longitudinal groove extending between the inner surface of the outer tube and the outer surface of the inner tube. The step of venting may further include venting air through the open top of the outer tube.

In yet a further embodiment, the present invention is directed to a container assembly including an outer tube and an inner tube, in which the outer tube includes an inner surface having a first longitudinal groove and the inner tube includes an outer surface having a second longitudinal groove. The first longitudinal groove and the second longitudinal groove are in alignment during insertion of the inner tube within the outer tube. Alignment of the grooves permits air to vent from between the outer tube and the inner tube to atmospheric pressure through a venting pathway extending to an open top of the outer tube. At least one of the outer tube or the inner tube may further include a textured surface area in engagement with the first longitudinal groove and the second longitudinal groove.

In one embodiment, the first longitudinal groove extends from a bottom of the outer tube towards an open top of the outer tube and the second longitudinal groove extends from an open top of the inner tube towards a bottom of the inner tube. This arrangement includes at least a top potion of the first longitudinal groove in contact with at least a bottom portion of the second longitudinal groove. Further, the top portion of the first longitudinal groove may sealingly engage with the bottom portion of the second longitudinal groove.

In an alternate arrangement, the first longitudinal groove may extend from the open top of the outer tube towards the bottom of the outer tube and the second longitudinal groove may extend from the bottom of the inner tube towards the open top of the inner tube. In this arrangement, at least a bottom portion of the first longitudinal groove is in contact with at least a top portion of the second longitudinal groove. Further, the bottom portion of the first longitudinal groove may sealingly engage or longitudinally overlap with the top portion of the second longitudinal groove.

In yet another embodiment, the present invention is directed to a method of assembling a container including such an inner tube contained within such an outer tube. In the method, a venting pathway is established during insertion of the inner tube within an open top of the outer tube through alignment of the first longitudinal groove with the second longitudinal groove. At least one of the first longitudinal groove and the second longitudinal groove extends to an open top of the respective tube to vent air from between the outer tube and the inner tube to atmospheric pressure.

In yet another embodiment, the present invention is directed to a container assembly including an outer tube and an inner tube with at least one of the outer tube or the inner tube including a first longitudinal groove and a second longitudinal groove which are in fluid connection through a textured surface area extending therebetween. The textured surface area may be located circumferentially between the first longitudinal groove and the second longitudinal groove with the first longitudinal groove and the second longitudinal groove located on an outer surface of the inner tube. The textured surface area may be located on the outer surface of the inner tube or on an inner surface of the outer tube extending between the first longitudinal groove and the second longitudinal groove.

Alternatively, the first longitudinal groove and the second longitudinal groove may be located on the inner surface of the outer tube. The textured surface area may be located on the outer surface of the inner tube or on the inner surface of the outer tube extending between the first longitudinal groove and the second longitudinal groove.

BRIEF DESCRIPTION OF THE DRAWINGS

FIG. 2 is a perspective view of one embodiment of the present invention depicting an inner tube having a longitudinal groove and a textured surface area;

FIG. 2A is a cross-sectional view taken along line A-A of the inner tube of FIG. 2;

FIG. 3A is a cross-sectional view of another embodiment of the present invention during assembly depicting an inner tube having a longitudinal groove partially inserted in an outer tube having a longitudinal groove;

FIG. 3B is a schematic view of the container assembly of FIG. 3A with the longitudinal groove of the inner tube aligned with the longitudinal groove of the outer tube during assembly;

FIG. 4A is a cross-sectional view of an inner tube of FIG. 3A fully inserted in the outer tube;

FIG. 4B is an enlarged cross-sectional view of a portion of FIG. 4A showing the first longitudinal groove in contact with a portion of the second longitudinal groove when the inner tube is fully inserted in the outer tube;

FIG. 4C is a cross-sectional view taken along line C-C of the container assembly of FIG. 4A;

FIG. 4D is a cross-sectional view taken along line D-D of the container assembly of FIG. 4A;

FIG. 5A is a cross-sectional view of an inner tube fully inserted in an outer tube in accordance with a further embodiment of the present invention;

FIG. 5B is an enlarged cross-sectional view of a portion of FIG. 5A showing a longitudinal groove of the inner tube in overlapping engagement with a longitudinal groove of the outer tube when the inner tube is fully inserted in the outer tube;

DETAILED DESCRIPTION OF THE INVENTION

Figure 1:
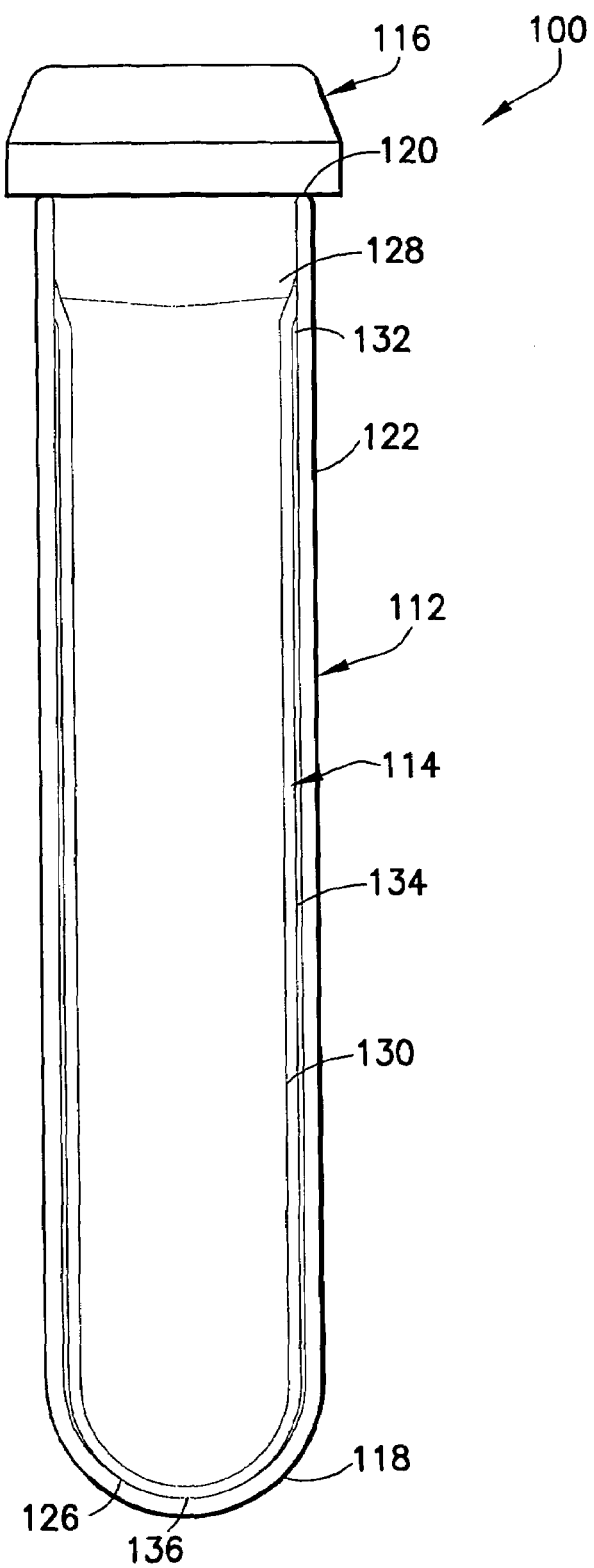
FIG. 1 is a side elevational view of a container assembly of the prior art.

While this invention is satisfied by embodiments in many different forms, there is shown in the drawings and will herein be described in detail, the preferred embodiments of the invention, with the understanding that the present disclosure is to be considered as exemplary of the principles of the invention and is not intended to limit the invention to the embodiments illustrated. Various other modifications will be apparent to and readily made by those skilled in the art without departing from the invention. The scope of the invention will be measured by the appended claims and their equivalents.

FIG. 1 is directed to a container assembly 100 of the prior art. The assembly 100 includes an outer tube 112, an inner tube 114 and a closure 116. Outer tube 112 is unitarily formed and includes a generally spherical closed bottom wall 118, an open top 120 and a cylindrical side wall 122 extending therebetween, whereby side wall 122 slightly tapers from open top 120 to closed bottom wall 118. Inner tube 114 is unitarily formed and includes a generally spherical closed bottom wall 126, an open top 128, and a cylindrical side wall 130 extending therebetween, whereby side wall 130 slightly tapers from open top 128 to closed wall 126. The open top 128 of the inner tube 114 is located below the open top 120 of the outer tube 112. Side wall 130 includes a flared-out region 132 adjacent open top 128 of inner tube 114 to hold the inner tube 114 tightly within the outer tube 112 as well as securing the inner tube 114 by a press fit. A substantially cylindrical space or annular gap 134 is defined between inner tube 114 and outer tube 112 and extends between the press-fit region and an abutment region 136 formed at the closed bottom walls 118, 126 of the outer tube 112 and the inner tube 114. Other embodiments may involve contact between a substantial portion of the outer surface of the inner tube 114 and the inner surface of the outer tube 112. Note that in such a configuration, the top of the inner tube 114 can be level with or below the top of the outer tube 112. Similarly, abutment at the bottom of the two tubes is not required.

Assembly 100 of the prior art is assembled by slidably inserting inner tube 114 into open top 120 of outer tube 112. During such assembly, pressure may build up in the annular gap 134 between the inner tube 114 and the outer tube 112. Such pressure can make assembly difficult, and can result in the inner tube 114 not being fully inserted within the outer tube 112, or being gradually forced out of the outer tube 112 over time. When the flared out region 132 contacts the inner surface of the outer tube 112, air becomes trapped, and an insertion force at the press-fit at the top of the inner tube 114 is required to overcome the force of the trapped air to complete assembly, with a portion of air still remaining trapped between the tubes. The flared-out region 132 may provide for centering of the inner tube 114 within the outer tube 112. To the extent the inner tube 114 abuts the bottom of the outer tube 112, some centering function may be provided.

The present invention is directed to a container assembly and a method of assembling a container having an inner tube contained within an outer tube, which overcomes the trapped air between the tubes. FIGS. 2 and 2A illustrate a configuration utilized to assemble a container assembly 10 according to the present invention. The container assembly 10 includes an outer tube 12, an inner tube 14 and a venting pathway 16.

Outer tube 12 is unitarily formed from a first plastic material and is similar in construction to the prior art outer tube 112 described above, including a generally spherical closed bottom wall 18, an open top 20 and a cylindrical side wall 22 extending therebetween. Side wall 22 may slightly taper from open top 20 to closed bottom wall 18. Side wall 22 of outer tube 12 includes a generally cylindrical inner surface 24 and an outer surface 26.

Inner tube 14 is unitarily formed from a second plastic material and is similar in construction to the prior art inner tube 114 described above, including a generally spherical closed bottom wall 28, an open top 30 and a cylindrical side wall 32 extending therebetween. Side wall 32 may slightly taper from open top 30 to closed bottom wall 28. Side wall 32 of inner tube 14 includes a generally cylindrical inner surface 34 and an outer surface 36.

A venting pathway 16 extends between the inner surface 24 of the outer tube 12 and the outer surface 36 of the inner tube 14. As will be discussed in more detail herein, the venting pathway 16 allows for any air present between the outer tube 12 and the inner tube 14 to vent out through the open end of the container to atmospheric or ambient air during insertion of the inner tube 14 within the outer tube 12, such as during assembly.

The venting pathway 16 is comprised of a combination of a textured surface area 40 and a longitudinal groove 38. The venting pathway 16 may be associated with the inner tube 14, the outer tube 12, or both. For example, as illustrated in the embodiment of FIGS. 2 and 2A, side wall 32 of inner tube 14 may include both a longitudinal groove 38 and a textured surface area 40 on the outer surface 36 thereof. As such, a venting pathway 16 is integrally formed with the inner tube 14 and extends between the inner surface 24 of the outer tube 12 and the outer surface 36 of the inner tube 14.

In the embodiment depicted in FIGS. 2 and 2A, the longitudinal groove 38 extends from the spherical closed bottom wall 28 of the inner tube 14 towards the open top 30 of the inner tube 14. The textured surface area 40 is located adjacent the open top 30 of the inner tube 14, and contacts the longitudinal groove 38. Desirably, the longitudinal groove 38 extends into and overlaps the textured surface area 40 of the inner tube 14.

The textured surface area $4p$ includes peaks or protrusions and valleys. The protrusions on the textured surface area 40 act to provide a tight fit for the assembly, thereby securing the outer tube 12 and the inner tube 14 together, while still providing a route between the peaks for air to escape. As will be described in more detail, the valleys between the protrusions on the textured surface area 40 define circuitous paths for venting air trapped between the outer surface 36 of the inner tube 14 and the inner surface 24 of the outer tube 12. The circuitous paths also act to inhibit liquid from passing from the inner tube 14 into the circumferential space between tubes, due to the pore size, and the viscosity and surface tension of the liquid. As a result, the container assembly 10 of the present invention can be efficiently assembled, and is also resistant to leakage of fluid into the space between the tubes.

The protrusions of the textured surface area 40 on the outer surface 36 of the inner tube 14 define a radial dimension or height "h". The protrusions desirably have a radial dimension that provides an overall outside diameter for the textured surface area 40 that is approximately equal to or slightly greater than the inside diameter of inner surface 24 of the outer tube 12. This geometrical relationship allows the protrusions on the textured surface area 40 on the outer surface 36 of the inner tube 14 to fittingly engage with the inner surface 24 of the outer tube 12, thereby securing the inner tube 14 and the outer tube 12 together while still providing a venting pathway 16 between the protrusion for air to escape.

The textured surface area 40 on the outer surface 36 of the inner tube 14 may be formed in any known manner, such as by physically depositing a surface material onto the tube wall to provide for such texture, or by integrally forming a texture into the tube wall. For example, a mold from which the tubes are constructed may be subjected to an electrical discharge machining process to provide the textured surface area 40 in the finished tube product. The finished area may be compared visually with a visual standard, such as the Charmilles Technologies Company visual surface standard (Charmilles Technology Company, Lincolnshire, lli.). Utilizing this standard practice, the textured surface area 40 defines a surface roughness finish of about 1.6-12.5 microns, preferably a finish of about 4.5-12.5 microns. As is known in the art, surface roughness is generally measured with a profilometer, which measures the arithmetic mean deviation of the roughness profile, Ra. The textured surface area 40 may also be cross-referenced visually to a Charmilles finish number of 1-42. Other roughening techniques that may be utilized to provide a textured surface area 40 may be used, for example, chemical etching.

While the above described one embodiment of the present invention, other combinations of the longitudinal groove 38 and the textured surface area 40 may be utilized to establish the venting pathway 16 between the outer tube 12 and the inner tube 14. For example, rather than having the longitudinal groove 38 and the textured surface area 40 located on the outer surface 36 of the inner tube 14 as described above, the longitudinal groove 38 and the textured surface area 40 may be located on the inner surface 24 of the outer tube 12. In such an arrangement where the textured surface area 40 is located on the inner surface 24 of the outer tube 12, the protrusions desirably have a radial dimension that provides an overall inner diameter for the textured surface area 40 approximately equal to or slightly less than the diameter of the outer surface 36 of the inner tube 14. Again, this aids in providing a tight fit and securement of the inner tube 14 within the outer tube 12.

Figure 2B:
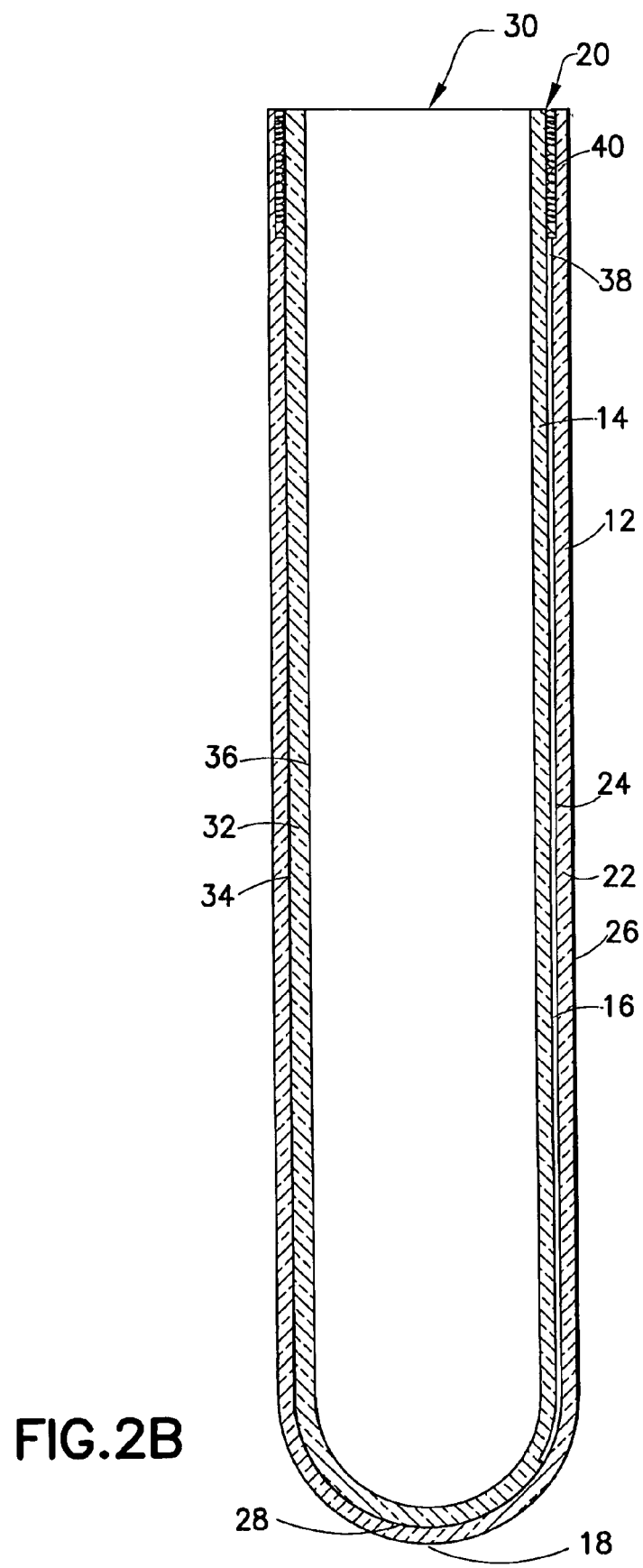
FIG. 2B is a cross-sectional view of an inner tube having a longitudinal groove and an outer tube having a textured surface area.
Figure 2C:
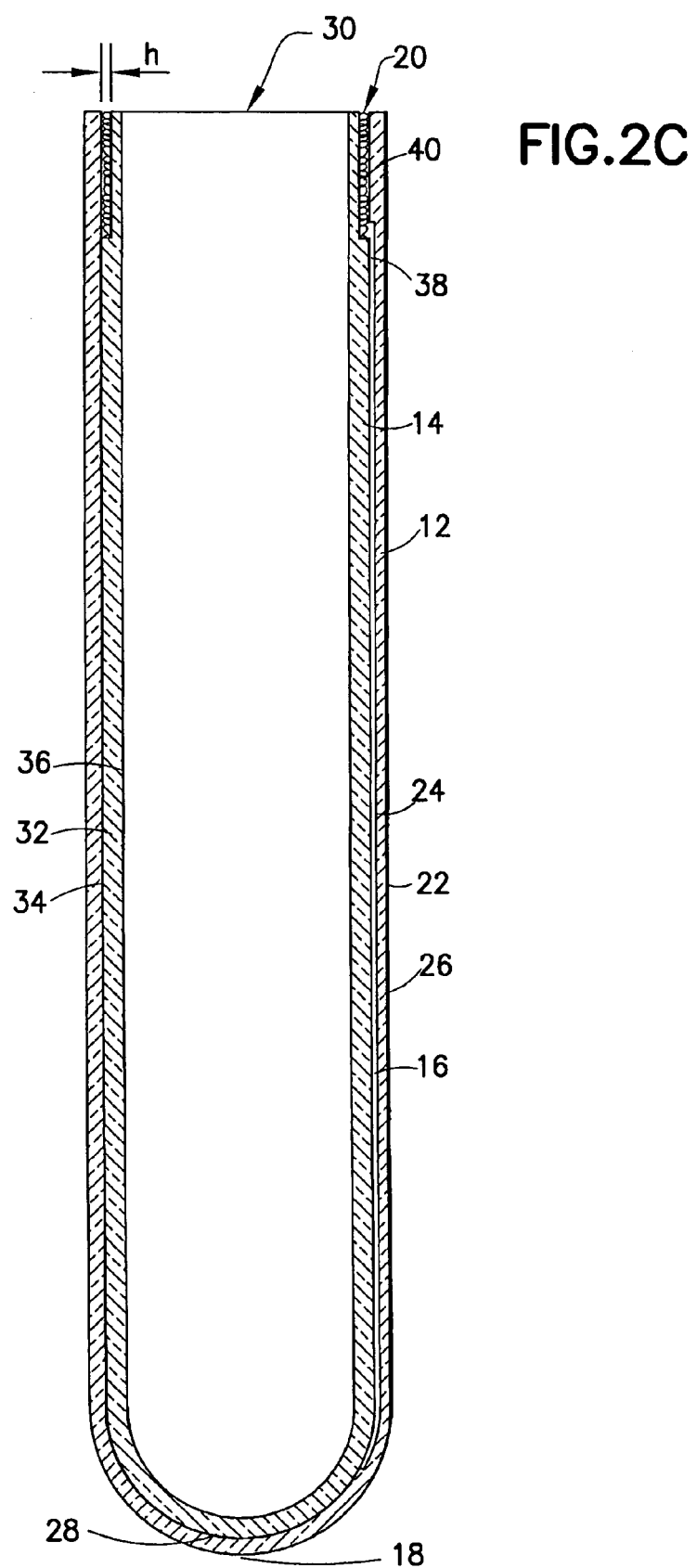
FIG. 2C is a cross-sectional view of an inner tube having a textured surface area and an outer tube having a longitudinal groove.

Alternatively, venting pathway 16 as illustrated in FIG. 2B, may include providing the longitudinal groove 38 on the outer surface 36 of the inner tube 14 and the textured surface area 40 on the inner surface 24 of the outer tube 12. FIG. 2C illustrates a corresponding arrangement where longitudinal groove 38 is located on the inner surface 24 of the outer tube 12 and the textured surface area 40 is located on the outer surface 36 of the inner tube 14. Regardless of the arrangement of the longitudinal groove 38 and the textured surface area 40, the combination of the longitudinal groove 38 and the textured surface area 40 define venting pathway 16 for allowing air to vent to atmospheric pressure during insertion of the inner tube 14 with the outer tube 12.

As noted, the outer tube 12 and the inner tube 14 are formed from plastic materials, and are desirably distinct plastic materials exhibiting different properties. Neither plastic material is required to meet all of the sealing requirements for the container. However, the respective plastic materials cooperate to ensure that the assembly achieves the necessary sealing, adequate shelf life and acceptable clinical performance. Preferably, one of the tubes may be formed from a material that exhibits acceptable gas vapor barrier characteristics, and the other of the containers may be formed from a material that provides a moisture barrier. The inner tube should also be formed from a material that has a proper clinical surface for the material being stored in the container assembly. Examples of particularly useful materials include polymeric materials such as polyethylene terephthalate, polypropylene, polystyrene, polycarbonate, and the like. In one preferred embodiment, outer tube 12 is formed from a polyethylene terephthalate, and inner tube 14 is formed from polypropylene. Such an embodiment provides excellent gas and vapor barrier properties, and provides the inner tube 14 as a softer material than the outer tube 12, which may assist in assembly, as will be discussed in more detail herein.

During assembly, the inner tube 14 is inserted into the open top 20 of the outer tube 12. Assembly of the container 10 typically occurs by a press-fit technique, whereby the inner tube 14 is press-fit into the outer tube 12 along an assembly line, such as through the use of a press mechanism, air pressure, or other means for press-fitting an inner tube within an outer tube.

As the inner tube 14 is inserted through the open top 20 of the outer tube 12, air within the outer tube 12 is trapped between the two tubes and is compressed and creates a build up of air pressure between the two tubes. Venting pathway 16 extending between the inner surface 24 of the outer tube 12 and the outer surface 36 of the inner tube 14 towards open end 20 of the outer tube 12 provides a mechanism for such trapped air to vent or be released to ambient air and atmospheric pressure to eliminate a pressure gradient between the tubes. In particular, the overall profiles and geometries of the two tubes provide for substantially contacting relation between the inner surface 24 of the outer tube 12 and the outer surface 26 of the inner tube 14, at least at some point during the insertion of the inner tube 14 within the outer tube 12. Accordingly, the venting pathway 16 provided through the combination of longitudinal groove 38 and textured surface area 40 provides a fluid pathway to allow any air trapped between the inner tube 14 and the outer tube 12 to travel through the longitudinal groove 38 and through the circuitous path defined by the peaks and valleys of the textured surface area 40. With the textured surface area 40 in fluid communication with the longitudinal groove 38 and provided at an area adjacent the open top 20 of outer tube 12 (whether it is provided on the inner surface 24 of the outer tube 12 or on the outer surface 36 of the inner tube 14), air can travel from the longitudinal groove 38 and through the textured surface area 40, and escape out through open top 20 of outer tube 12 to complete assembly of the inner tube within the outer tube.

As noted during assembly, it is contemplated that at least a portion of the outer surface 36 of the inner tube 14 may come into contact with at least a portion of the inner surface 24 of the outer tube 12. Such contact may occur, for example, between the respective bottom wall surfaces 18 and 28 of the inner tube 14 and the outer tube 12. Also, during assembly, the textured surface area 40 may provide a structural element for assisting in maintaining inner tube 14 in place within outer tube 12. In particular, as noted above, the radial dimension of the protrusions of the textured surface area 40 and the internal diameter of the outer tube 12 should be sufficiently similar so as to cause an interference fit therebetween. Such features may provide for an interference engagement between the textured surface area 40 and the inner surface 24 of the outer tube 12, thereby maintaining the inner tube 14 within the outer tube 12. Also, as noted, the inner tube 14 may be of a softer material than the outer tube 12, such that the inner tube 14 is slightly compressed or biased radially inwardly at the top end adjacent the textured surface area 40 when fully inserted within the outer tube 12, which results in the inner tube 14 naturally exerting a radially outward force, engaging the textured surface area 40 against the inner surface 24 of the outer tube 12.

FIGS. 3-8 depict further embodiments of the invention, which includes many components which are substantially identical to the components of FIG. 2. Accordingly, similar components performing similar functions will be numbered identically to those components of FIGS. 2-2C, except that a suffix "a" will be used to identify those similar components in the embodiments of FIGS. 3-5D; a suffix "b" will be used to identify those similar components in FIGS. 6-7; and a suffix "c" will be used to identify those similar components in FIG. 8.

In the embodiment of FIGS. 3-5D, the container assembly 10a includes an outer tube 12a having a bottom wall 18a, an open top 20a, and a side wall 22a extending therebetween. The side wall 22a defines an inner surface 24a and an outer surface 26a. The inner tube 14a includes a bottom wall 28a, an open top 30a, and a side wall 32a extending therebetween. The side wall 32a defines an inner surface 34a and an outer surface 36a.

In this embodiment, venting pathway 16a is comprised of a combination of a first longitudinal groove 42 and a second longitudinal groove 38a. For example, side wall 22a of the outer tube 12a may include first longitudinal groove 42 on the inner surface 24a thereof and the side wall 32a of the inner tube 14a may include second longitudinal groove 38a on the outer surface 36a thereof.

Figure 5C:
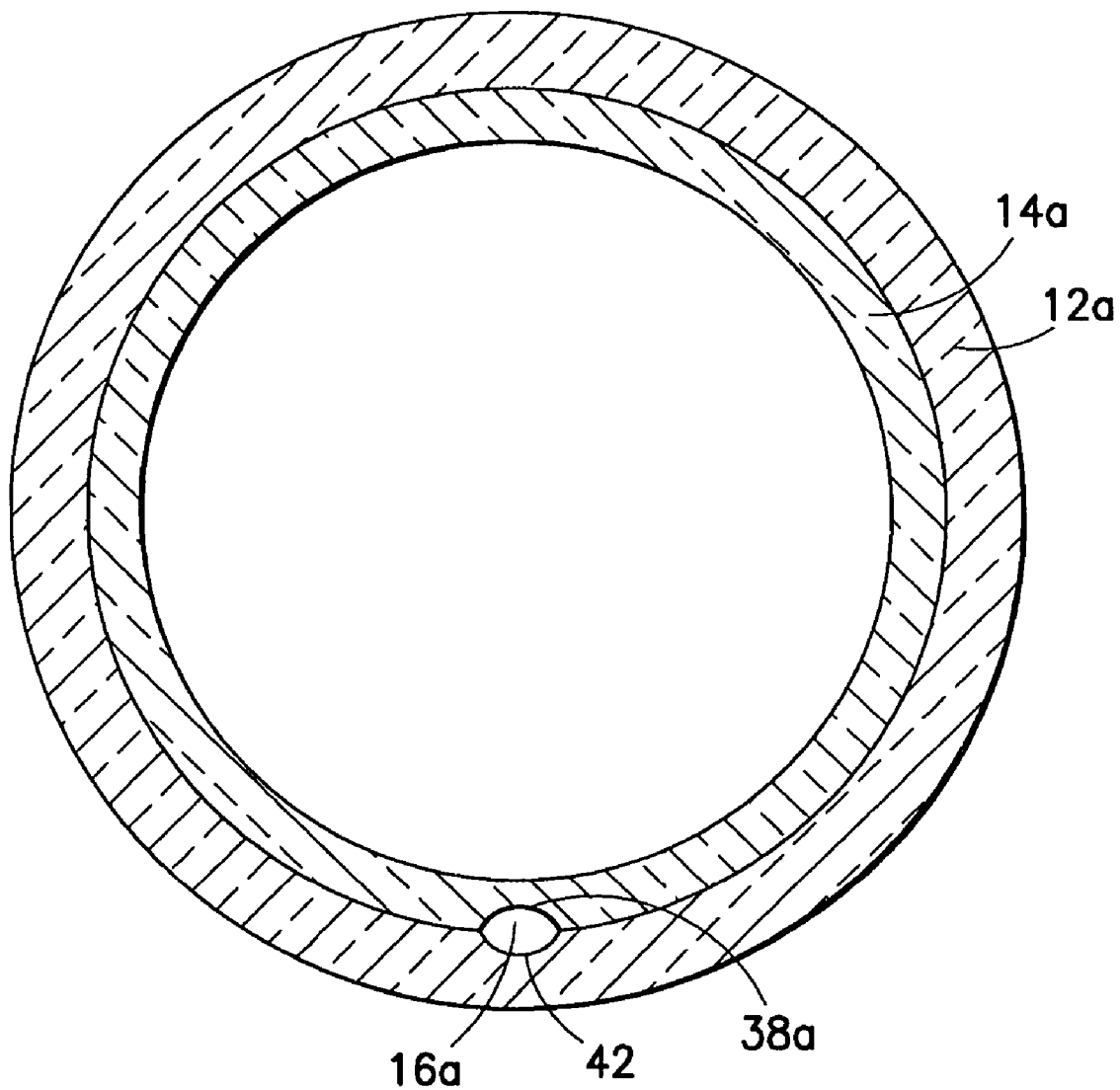
FIG. 5C is a cross-sectional view taken along line C-C of FIG. 5A.
Figure 5D:
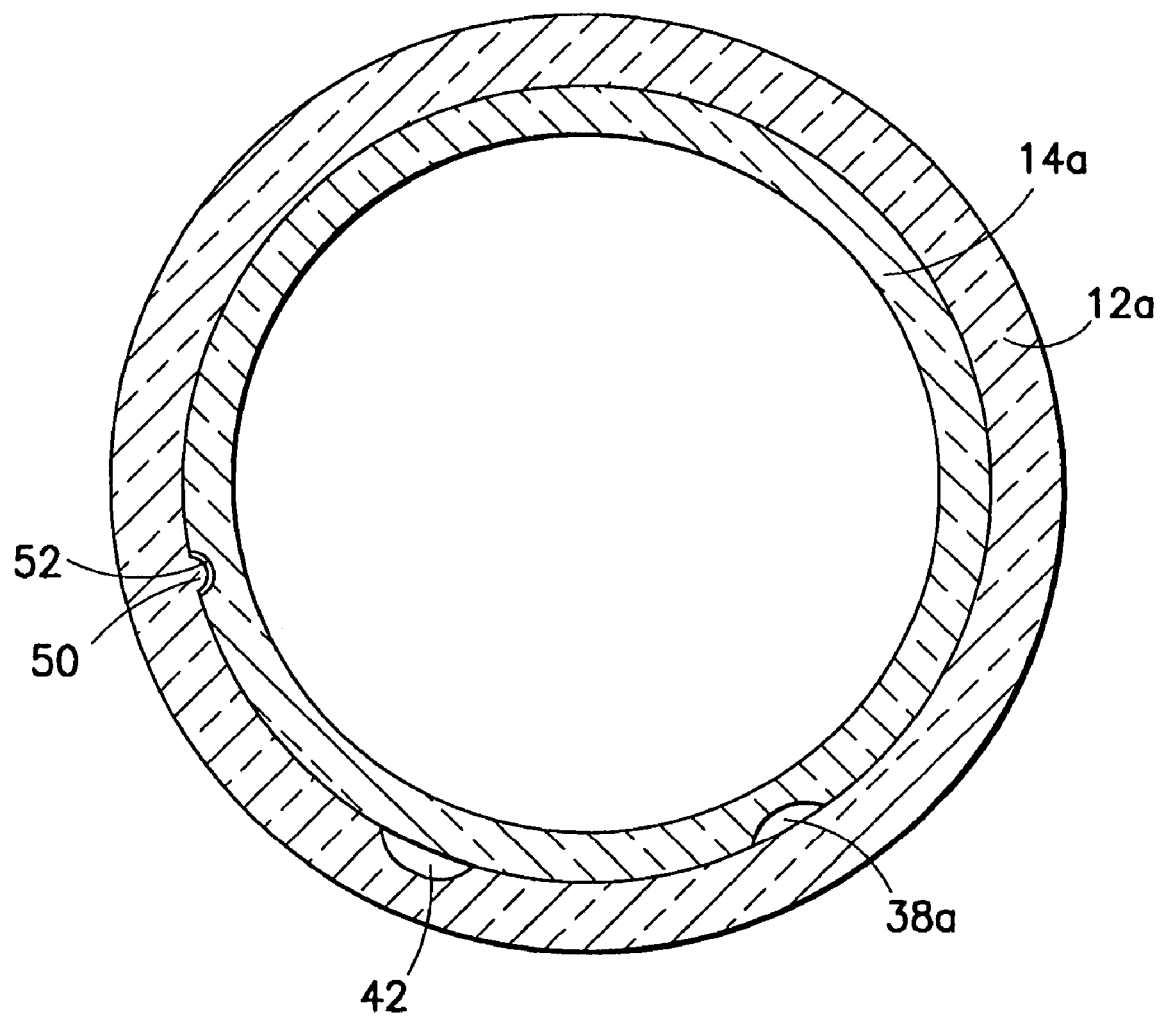
FIG. 5D is a cross-sectional view of the container assembly of FIG. 5A with the first longitudinal groove rotated away from the second longitudinal groove and the inner tube having a ridge for alignment, in accordance with another embodiment of the present invention.

In the embodiment depicted in FIGS. 3-5D, the longitudinal groove 42 on the inner surface 24a of the outer tube 12a extends from the open top 20a of the outer tube 12a towards the bottom wall 28a of the outer tube 12a. The longitudinal groove 38a on the outer surface 36a of the inner tube 14a extends from the bottom wall 28a of the inner tube 14a towards the open top 30a of the inner tube 14a. The longitudinal grooves 38a and 42 extend for a portion of the length of the respective tubes, such that at least a top portion 44 of longitudinal groove 38a of the inner tube 14a is in contact with at least a bottom portion 46 of the longitudinal groove 42 of the outer tube 12a. Alternatively as illustrated in FIG. 5, longitudinal grooves 38a and 42 may longitudinally overlap, for example the top portion 44 of longitudinal groove 38a in full contact with the bottom portion 46 of longitudinal groove 42 for fluid communication to form venting pathway 16a, as further described hereinafter.

FIGS. 3A and 3B illustrate the inner tube 14a partially inserted in the outer tube 12a during assembly. During insertion of the inner tube 14a into the open top 20a of the outer tube 12a, longitudinal groove 38a on the outer surface 36a of the inner tube 14a is in alignment with longitudinal groove 42 on the inner surface 24a of the outer tube 12a thereby providing a venting pathway 16a for air to escape during assembly. Thus, during insertion of the inner tube 14a within the outer tube 12a, trapped air is vented from between the outer tube 12a and the inner tube 14a to atmospheric pressure. For example, as the inner tube 14a is inserted into the outer tube 12a, trapped air travels up through longitudinal groove 38a to longitudinal groove 42 and then through the open top 20a of the outer tube 12a.

Upon completion of assembly of the inner tube 14a within the outer tube 12a, as illustrated in FIGS. 4A-4D, bottom wall 28a of the inner tube 14a preferably abuts bottom wall 18a of the outer tube 12a for securement of the inner tube 14a within the outer tube 12a. Additionally, upon fully inserting the inner tube 14a into the outer tube 12a, the top portion 44 of the longitudinal groove 38a on the outer surface 36 of the inner tube 14a comes in contact with the bottom portion 46 of the longitudinal groove 42 on the inner surface 24a of the outer tube 12a to seal venting pathway 16a. FIG. 4C is a cross-sectional view taken along line C-C of FIG. 4A with the longitudinal groove 42 in the inner surface 24a of the outer tube 12a. Correspondingly, FIG. 4D illustrates a cross-sectional view taken along line D-D of FIG. 4A with longitudinal groove 38a located in outer surface 36a of the inner tube 14a.

In other variations, the longitudinal grooves 38a and 42 may be arranged in a corresponding manner, where the longitudinal groove 38a on the outer surface 36a of the inner tube 14a may extend from the open top 30a towards the bottom wall 28a and the longitudinal groove 42 on the inner surface 24a of the outer tube 12a may extend from the bottom wall 18a towards the open top 20a of the outer tube 12a. Optionally, longitudinal grooves 38a and 42 may extend along any portion along the length of inner tube 14a and outer tube 12a such that venting pathway 16a allows trapped air to escape prior to fully inserting inner tube 14a within outer tube 12a. For example, venting pathway 16a may extend along the surface of side walls 22a, 32a any distance, provided that venting of trapped air is accomplished prior to full insertion of the inner tube 14a within outer tube 12a, desirably prior to any build up of pressure between the tubes. Thus, while the embodiment illustrated in FIGS. 3A and 3B, shows longitudinal groove 38a extending from bottom wall 28a, it is not necessary for longitudinal groove 38a to do so and may accordingly, extend along any length of the inner tube 14a or outer tube 12a.

Accordingly, the depths of the longitudinal grooves 38a and 42 may be designed such that the venting pathway 16a is sealed upon full insertion of the inner tube 14a into the outer tube 12a. Closing the venting pathway 16a may be desired in circumstances where fluid leaks may occur between the inner tube 14a and the outer tube 12a. For example, a short groove may be included adjacent the open top 20a of the assembly, such that the close-off of venting pathway 16a occurs near the open top 20a in the assembly 10a. Thus, any leakage between the inner tube 14a and outer tube 12a would be retained adjacent the open top 20a of the container assembly 10a, where it might be covered by a tube closure.

In a related embodiment FIGS. 5-5D illustrate longitudinal grooves 38a and 42 forming venting pathway 16a in fluid communication during and after completion of assembly. For purposes of the present invention, "fluid communication" defines communication of air through venting pathway 16a and is not meant to encompass liquid, in particular blood transmission through venting pathway 16a. FIG. 5A, illustrates the inner tube 14a having longitudinal groove 38a fully inserted in the outer tube 12a having longitudinal groove 42. In this embodiment, longitudinal grooves 38a and 42 sealingly engage, particularly longitudinally overlapping to allow venting pathway 16a to remain open after assembly. By having the longitudinal grooves 38a and 42 longitudinally overlapping, air may be continuously removed after assembly through venting pathway 16a.

During assembly of the container assembly 10a, alignment structures may be utilized to ensure alignment during assembly to provide venting pathway 16a for air to escape. Alignment structures may be included in the inner tube 14a and the outer tube 12a to ensure that the longitudinal grooves 38a and 42 maintain alignment during assembly. Such structures may take any form, for example, a long groove in one tube and a ridge or ridge portions on the respective tube. Any other technique for alignment apparent to those skilled in the art may also be utilized.

To address possible leakage, the process may be designed such that the inner tube, when insertion is fully completed or performed to an extent where an acceptably small amount of air remains between the tubes, can be rotated relative to the outer tube, to essentially close this path, as illustrated in FIG. 5D.

Alignment structures may also be provided to ensure alignment until the inner tube 14a is inserted to an acceptable depth. At that point, the inner tube 14a would clear the alignment structures, and be free to rotate relative to the outer tube 12a. The assembly process may also be designed to perform this rotation, optionally using a locking feature. An example of a locking feature is illustrated in FIG. 5D with the assembly being in cooperation between a groove 50 and ridge or knob 52.

As with the above embodiment, a short groove adjacent the open top 20a of the assembly may be utilized, such that the sealing of the paths occurs high in the assembly. Thus, any leakage between the tubes would be retained at the top of the container assembly, where it may be covered by a tube closure.

Figure 6:
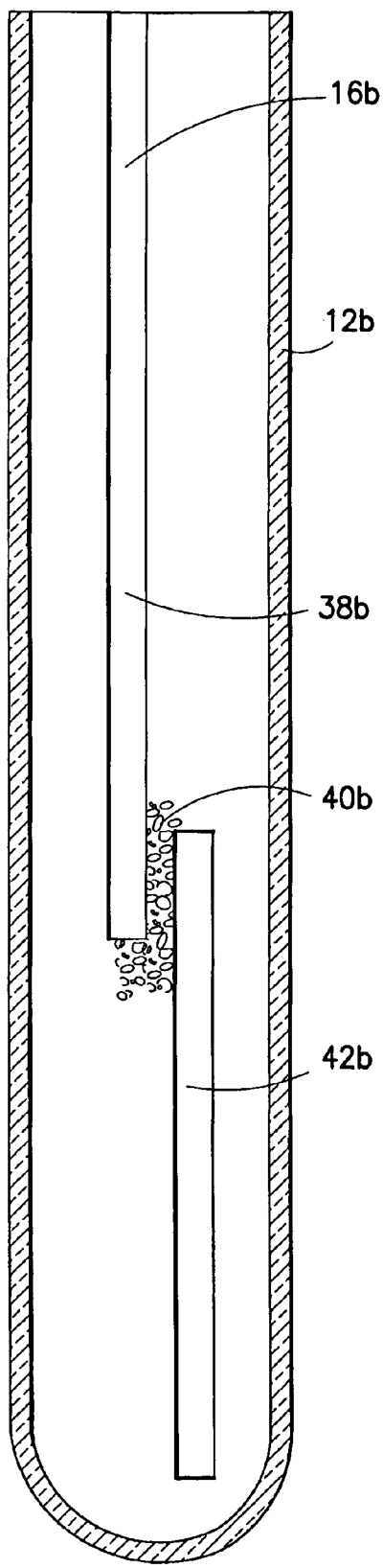
FIG. 6 is a cross-sectional view in accordance with a further embodiment of the present invention showing an outer tube having two longitudinal grooves overlapping and a textured surface area located circumferentially on an inner surface.
Figure 7:
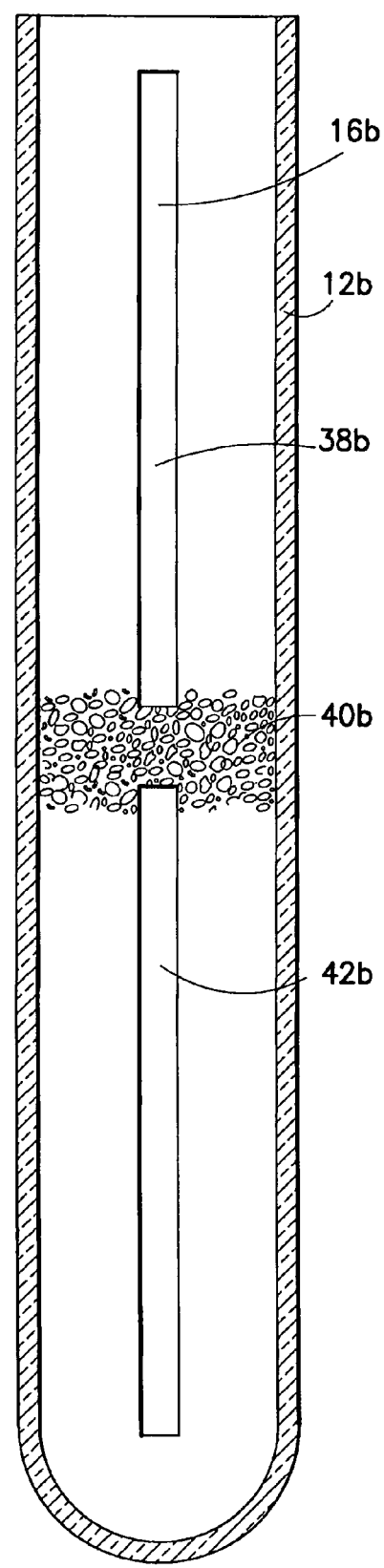
FIG. 7 is a cross-sectional view of yet a further embodiment of the present invention showing an inner tube having two longitudinal grooves and a textured surface area therebetween.

Another embodiment of the present invention is illustrated in FIGS. 6 and 7. In this embodiment, venting pathway 16b comprises longitudinal grooves 38b and 42b and a textured surface area 40b. FIG. 6 illustrates the outer tube 12b having longitudinal grooves 38b and 42b and textured surface area 40b located on the inner surface 24b of the outer tube 12b.

Desirably, the longitudinal grooves 38b, 42b overlap longitudinally in fluid communication with the textured surface area 40b located circumferentially between the longitudinal grooves 38b and 42b at the area of longitudinal overlap, thereby providing textured surface area 40b also in overlapping contact with longitudinal grooves 38b and 42b. Alternatively, textured surface area 40b may be disposed medially along the length of the inner tube 14b or the outer tube 12b, such that at least a portion of the textured surface area 40b overlaps longitudinal grooves 38b and 42b.

Alternatively, as illustrated in FIG. 7, longitudinal grooves 38b, 42b may not overlap longitudinally to form venting pathway 16b. Rather, textured surface area 40b may span a longitudinal space between longitudinal grooves 38b and 42b. Desirably the textured surface area 40b is positioned toward the open top of the assembly. Because the textured region is designed to inhibit fluid passage completely therethrough, any leakage between the tubes is retained at the top of the container assembly.

Other variations of the above embodiments may be contemplated. The longitudinal grooves 38b and 42b and the textured surface area 40b may be independently located on an outer surface 36b of the inner tube 14b or on the inner surface 24b of the outer tube 12b, or in any combination on the inner tube 14b and outer tube 12b. For example, longitudinal grooves 38b and 42b may be located on the inner surface 24b of the outer tube 12b and the textured surface area 40b may be located on the outer surface of the inner tube 14b. In the case where the longitudinal grooves 38b and 42b and the textured surface area 40b are located on both the inner tube 14b and outer tube 12b, alignment features such as discussed above are useful to ensure longitudinal grooves 38b, 40b and textured surface area 40b are aligned to provide an escape path for trapped air.

Figure 8:
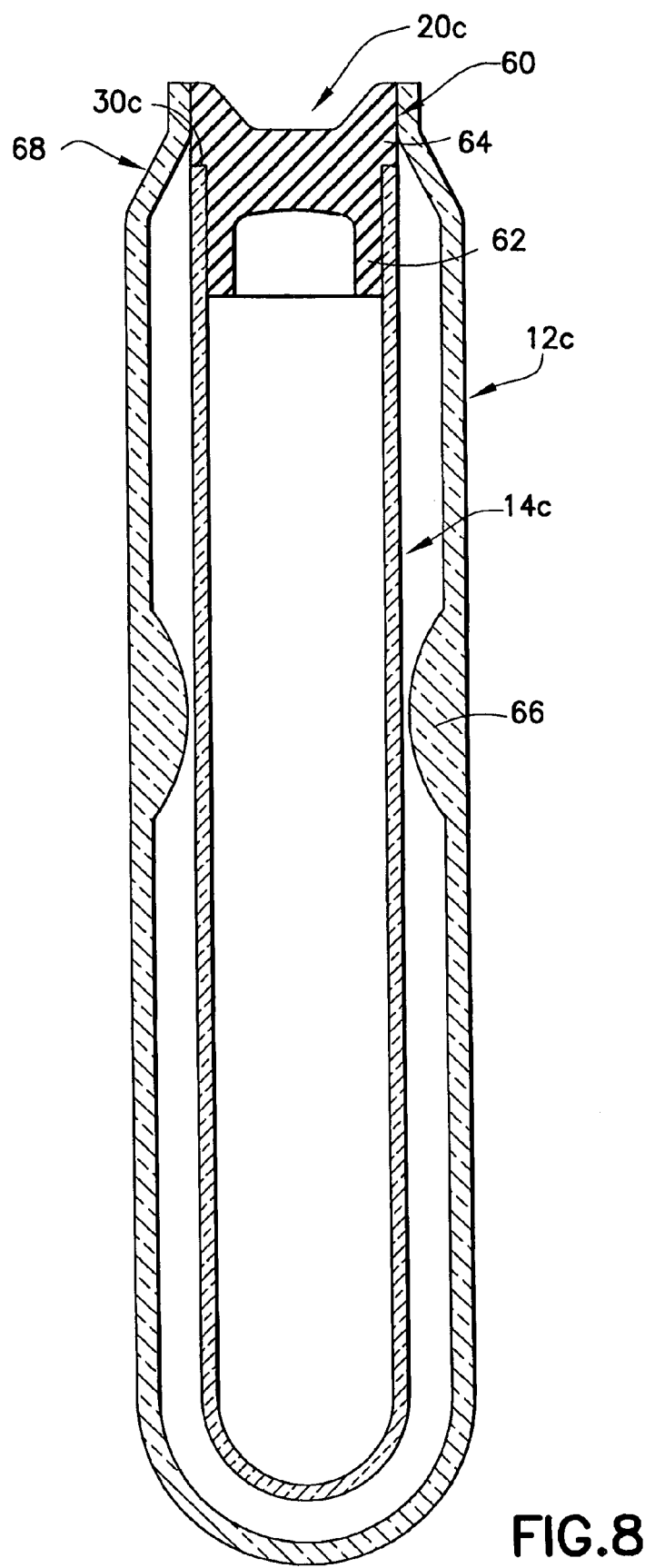
FIG. 8 is a cross-sectional view of a container assembly having a stopper in accordance with another embodiment of the present invention.

In another embodiment, reflected in FIG. 8, the outer tube 12c and the inner tube 14c are configured with a stepped stopper 60, with the open top 30c of the inner tube 14c located below the open top 20c of the outer tube 12c. As shown in FIG. 8, first step 62 fits snugly within the inner tube 14c and second step 64 fits snugly within the outer tube 12c, with an annular gap, present between the tubes. The stopper 60 is formed of an elastomeric material that forms a tight seal. The stopper 60 performs multiple functions. For example, the stopper 60 seals the inner tube from vacuum loss, seals the gap between the inner and outer tubes from fluid leakage therebetween, and also acts to secure the inner tube 14c and outer tube 12c together. Advantageously, spacers 66 are provided to further secure the inner tube 14c and the outer tube 12c together. The spacers 66 are typically molded into the outer tube 12c, but may be a separate element, or part of the inner tube 14c.

In the embodiment shown in FIG. 8, the end adjacent the open top 20c of the outer tube 12c has a tapered region 68 at the area where the outer tube 12c contacts the stopper 60. This region is useful in some embodiments in that only a small step may be required to reach the inner diameter of the tapered region. This taper is optional, and may not be required, in situations where for example the outer diameter of the inner tubes is only slightly smaller than the inner diameter of the outer tube.

In another embodiment, the characteristics of the assembly environment assist escape of air trapped between two tubes. In particular, an outer tube is heated to provide expansion of its diameter. When an inner tube (at an ambient temperature) is placed into the heated outer tube, the annular gap between the tubes is provided, this gap extending to the exterior of the assembly for air to escape. As the outer tube cools, it contracts to snugly fit against the inner tube. The tubes may be designed for contact (upon cooling) over only a region of the tubes, such as shown in FIG. 1, or over a substantial portion of their surface. To maintain the inner tube at its desired location during cooling, it may be advantageous to ensure abutment at the bottom regions of the tube, and/or to design the assembly equipment to hold the inner tube in place until a time at which the outer tube has cooled enough to initiate contact. Alternatively, assuming a uniform contraction rate of the outer tube, the assembly should be self-centering during the cooling process. The opposite is also possible, i.e., the inner tube being cooled prior to insertion, and then allowed to expand as it warms up. Heating and/or cooling of the two tubes may also be performed in combination.

In embodiments where an annular gap is provided, the size of the annular gap between the tubes is generally made as small as reasonably possible, to keep the volume of trapped air similarly small. Gap ranges of 0.001 to 0.10 inch are generally useful and commercially possible.

Assembly of a container for use in specimen collection, after assembly, may include disposing an additive therein, subjecting the container to an evacuated chamber with a pressure below atmospheric pressure, applying a seal such as an elastomeric stopper or pierceable membrane, and sterilizing the container by a process such as irradiation, for example, with cobalt 60 radiation, ethylene oxide gas exposure, or electron-beam exposure.

A container closure can further be provided on the open end of the container, such as an elastomeric stopper as is known in the art. Moreover, the container can be evacuated using any evacuation techniques. The container assembled as such is particularly useful as an evacuated blood collection container for blood collection procedures, as are commonly known in the art.

While the present invention has been described in terms of specific embodiments, it is further contemplated that the assembly and the method of manufacturing thereof can be used with other applications.

The invention claimed is:

1. A container assembly comprising:
   an outer tube having a closed bottom, an open top and a side wall extending therebetween, said side wall defining an inner surface and an outer surface;
   an inner tube disposed within the outer tube, said inner tube having a closed bottom, an open top and a side wall having an inner surface and an outer surface extending therebetween; and
   a venting pathway extending between the inner surface of the outer tube and the outer surface of the inner tube, said venting pathway comprising a combination of a textured surface area and a longitudinal groove for allowing air to vent to atmospheric pressure during insertion of the inner tube within the outer tube and wherein the textured surface area has a bottom boundary and at least a portion of the longitudinal groove extends below the bottom boundary of the textured area.

2. The container assembly of claim 1, wherein the venting pathway is integrally formed with at least one of the inner tube and the outer tube.

3. The container assembly of claim 1, wherein the longitudinal groove and the textured surface area are located on the outer surface of the inner tube.

4. The container assembly of claim 1, wherein the longitudinal groove extends from adjacent the bottom of the inner tube towards the open top of the inner tube to a location adjacent the textured surface area.

5. The container assembly of claim 1, wherein the textured surface area is adjacent the open top of the inner tube.

6. The container assembly of claim 1, wherein the textured surface area is located on the outer surface of the inner tube.

7. The container assembly of claim 6, wherein the textured surface area further includes protrusions having a radial dimension equal to at least a diameter of the inner surface of the outer tube for fitting of the inner tube within the outer tube.

8. The container assembly of claim 6, wherein the longitudinal groove is located on the inner surface of the outer tube.

9. The container assembly of claim 1, wherein the textured surface area is located on the inner surface of the outer tube and the longitudinal groove is located on the outer surface of the inner tube.

10. The container assembly of claim 1, wherein the textured surface area and the longitudinal groove are located on the inner surface of the outer tube.

11. The container assembly of claim 1, wherein the venting pathway further comprises a second longitudinal groove.

12. The container assembly of claim 11, wherein the second longitudinal groove is in fluid communication with the longitudinal groove through the textured surface area.

13. The container assembly of claim 1, wherein the textured surface area has a surface finish of about 1.6-12.5 microns.

14. A method of assembling a container comprising an inner tube contained within an outer tube, said method comprising:
    providing an outer tube and an inner tube, both of said outer tube and said inner tube including a closed bottom, an open top and a side wall defining an inner surface and an outer surface extending therebetween;
    inserting the inner tube within the outer tube; and
    venting air between the outer tube and the inner tube to atmospheric pressure during insertion of the inner tube within the outer tube through a venting pathway extending between the inner surface of the outer tube and the outer surface of the inner tube, said venting pathway comprising a combination of a textured surface area and a longitudinal groove and wherein the textured surface area has a bottom boundary and at least a portion of the longitudinal groove extends below the bottom boundary of the textured area.

15. The method according to claim 14, wherein the step of venting air further comprises venting air through the open top of the outer tube.

16. The method according to claim 14, wherein the venting pathway is integrally formed with at least one of the inner tube and the outer tube.

17. The method according to claim 14, wherein the longitudinal groove and the textured surface area are located on the outer surface of the inner tube.

18. The method according to claim 17, wherein the textured surface area further includes protrusions having a radial dimension equal to at least a diameter of the inner surface of the outer tube for engagement of the inner tube within the outer tube.

19. The method according to claim 14, wherein the longitudinal groove extends from adjacent the bottom of the inner tube towards the open end of the inner tube to a location adjacent the textured surface area.

20. A container assembly comprising:
    an outer tube having a closed bottom, an open top and a side wall extending therebetween, said side wall defining an inner surface and an outer surface, said inner surface having a first longitudinal groove;
    an inner tube contained within the outer tube, said inner tube having a closed bottom, an open top and a side wall having an inner surface and an outer surface extending therebetween, the outer surface of the inner tube having a second longitudinal groove; and
    wherein the first longitudinal groove and the second longitudinal groove are in alignment during insertion of the inner tube within the outer tube to permit air to vent from between the outer tube and the inner tube to atmospheric pressure though a venting pathway extending to the open top of the outer tube.

21. The container assembly of claim 20, wherein the first longitudinal groove extends from the bottom of the outer tube towards the open top of the outer tube and the second longitudinal groove extends from the open top of the inner tube towards the bottom of the inner tube, whereby at least a top portion of the first longitudinal groove is in contact with at least a bottom portion of the second longitudinal groove.

22. The container assembly of claim 21, wherein the top portion of the first longitudinal groove sealingly engages with the bottom portion of the second longitudinal groove.

23. The container assembly of claim 22, wherein the top portion of the first longitudinal groove longitudinally overlaps with the bottom portion of the second longitudinal groove.

24. The container assembly of claim 20, wherein the first longitudinal groove extends from the open top of the outer tube towards the bottom of the outer tube and the second longitudinal groove extends from the bottom of the inner tube towards the open top of the inner tube, whereby at least a bottom portion of the first longitudinal groove is in contact with at least a top portion of the second longitudinal groove.

25. The container assembly of claim 24, wherein the bottom portion of the first longitudinal groove sealingly engages with the top portion of the second longitudinal groove.

26. The container assembly of claim 25, wherein the bottom portion of the first longitudinal groove longitudinally overlaps the top portion of the second longitudinal groove.

27. The container assembly of claim 20, wherein at least one of the outer tube or the inner tube further comprises a textured surface area in engagement with the first longitudinal groove and the second longitudinal groove thereof.

28. A method of assembling a container comprising an inner tube contained within an outer tube, the method comprising:
    providing an outer tube having a closed bottom, an open top and a side wall extending therebetween, said side wall defining an inner surface and an outer surface, said inner surface having a first longitudinal groove;
    providing an inner tube within the outer tube, said inner tube having a closed bottom, an open top and a side wall having an inner surface and an outer surface extending therebetween, the outer surface of the inner tube having a second longitudinal groove; and
    establishing a venting pathway during insertion of the inner tube within the open top of the outer tube through alignment of said first longitudinal groove and said second longitudinal groove, at least one of said first longitudinal groove and said second longitudinal groove extending to the open top of the respective tube to vent air from between the outer tube and the inner tube to atmospheric pressure.

29. The method of claim 28, wherein the first longitudinal groove extends from the bottom of the outer tube towards the open top of the outer tube and the second longitudinal groove extends from the open top of the inner tube towards the bottom of the inner tube and wherein the establishing step comprises inserting the inner tube within the outer tube with the second longitudinal groove in alignment with the first longitudinal groove.

30. The method of claim 29, wherein the top portion of the first longitudinal groove sealingly engages with the bottom portion of the second longitudinal groove when the inner tube is fully inserted within the outer tube.

31. The method of claim 28, wherein the first longitudinal groove extends from the open top of the outer tube towards the bottom of the outer tube and the second longitudinal groove extends from the bottom of the inner tube towards the open top of the inner tube and wherein the establishing step comprises inserting the inner tube within the outer tube with the first longitudinal groove in alignment with the second longitudinal groove.

32. The method of claim 31, wherein the bottom portion of the first longitudinal groove sealingly engages with the top portion of the second longitudinal groove when the inner tube is fully inserted within the outer tube.

33. A container assembly comprising:
an outer tube having a closed bottom, an open top and a side wall extending therebetween, said side wall defining an inner surface and an outer surface;
an inner tube contained within the outer tube, said inner tube having a closed bottom, an open top and a side wall having an inner surface and an outer surface extending therebetween; and
wherein at least one of the outer tube or the inner tube further comprises a first longitudinal groove and a second longitudinal groove, said first longitudinal groove and said second longitudinal groove in fluid communication through a textured surface area extending therebetween during insertion of the inner tube within the outer tube to permit air to vent from between the outer tube and the inner tube to atmospheric pressure through a venting pathway extending to the open top of the outer tube and wherein the textured surface area includes a boundary and a portion of at least one of said first longitudinal groove and said second longitudinal groove extends beyond said boundary of said textured surface area.

34. The container assembly of claim 33, wherein the textured surface area is located circumferentially between the first longitudinal groove and the second longitudinal groove.

35. The container assembly of claim 33, wherein the first longitudinal groove and the second longitudinal groove are located on the outer surface of the inner tube.

36. The container assembly of claim 35, wherein the textured surface area is located on the outer surface of the inner tube extending between the first longitudinal groove and the second longitudinal groove.

37. The container assembly of claim 35, wherein the textured surface area is located on the inner surface of the outer tube extending between the first longitudinal groove and the second longitudinal groove.

38. The container assembly of claim 33, wherein the first longitudinal groove and the second longitudinal groove are located on the inner surface of the outer tube.

39. The container assembly of claim 38, wherein the textured surface area is located on the outer surface of the inner tube extending between the first longitudinal groove and the second longitudinal groove.

40. The container assembly of claim 38, wherein the textured surface area is located on the inner surface of the outer tube extending between the first longitudinal groove and the second longitudinal groove.

* * * * *

UNITED STATES PATENT AND TRADEMARK OFFICE
CERTIFICATE OF CORRECTION

PATENT NO. : 7,578,977 B2  Page 1 of 1
APPLICATION NO. : 10/785344
DATED : August 25, 2009
INVENTOR(S) : Kirk D. Swenson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1555 days.

Signed and Sealed this

Fourteenth Day of September, 2010

David J. Kappos
*Director of the United States Patent and Trademark Office*